May 19, 1959 — F. B. HALFORD ET AL — 2,887,456

METAL CATALYST PACKS

Filed June 26, 1956

INVENTORS
Arthur V. Cleaver
George E. Preece

BY
ATTORNEYS

United States Patent Office 2,887,456
Patented May 19, 1959

2,887,456

METAL CATALYST PACKS

Frank Bernard Halford, deceased, late of Northwood, England, by Alfred Hardy Bentley, George Purvis Bulman, and John Hardy Bentley, executors, and Arthur Valentine Cleaver, all of London, and George Edward Preece, Cheltenham, England, assignors to The De Havilland Engine Company Limited, Leavesden, England, a company of Great Britain Application June 26, 1956, Serial No. 593,847

4 Claims. (Cl. 252—477)

This invention relates to metal catalyst packs through which can be passed fluids to be subjected to catalytic action. Such packs may be employed, for instance, in rocket motors where it is desired to decompose hydrogen peroxide by the catalytic action of a metal such as silver.

A metal catalyst pack according to the invention comprises several rows of transversely corrugated thin strips comprising catalyst metal at least on the surface, separated by thin plain strips, all the strips being arranged edge on to the flow of fluid, and the corrugations of the corrugated strips are in the form of chevrons extending across the width of the strip.

The purpose of employing chevron-like corrugations is to increase the turbulence of the fluid flowing through the catalyst pack and thereby increase the possibility of every part of the fluid coming into contact with the catalyst metal.

The catalyst strips may consist wholly of the catalyst metal or they may consist of inactive metal (i.e. metal having no catalytic action for the purpose in hand) coated with the catalyst metal.

One form of the catalyst pack embodying the invention will now be specifically described by way of example with reference to the accompanying drawings in which.

Figure 1:
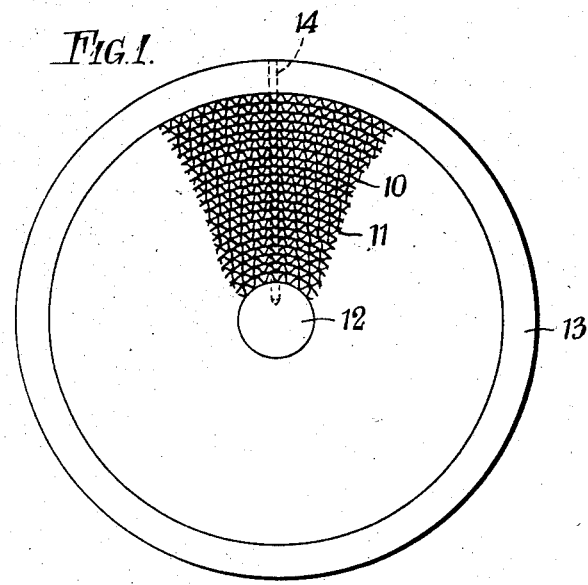
Figure 1 is an end view of the catalyst pack looking in the direction of flow, in which, for simplicity, only a small sector of the strips of catalyst metal is shown.
Figure 2:
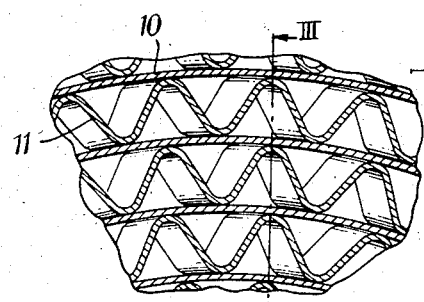
Figure 2 is an enlarged end view of a fragmentary section of the catalyst pack.
Figure 3:
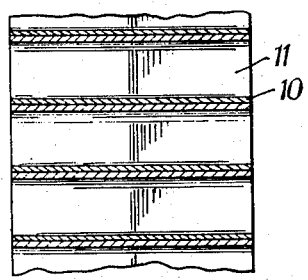
Figure 3 is a transverse section taken on the line III—III in Figure 2.

In the catalyst pack shown in the drawings alternate plain strips 10 and corrugated strips 11 are rolled spirally to provide a pack of circular cross-section. One end of a corrugated strip and one end of a plain strip are attached to central pin 12 and are wound together around the pin in the form of a spiral scroll. The whole element so wound is then fitted into a rigid outer shell 13 and is locked in position by suitably spaced radial pins 14.

Figure 4:
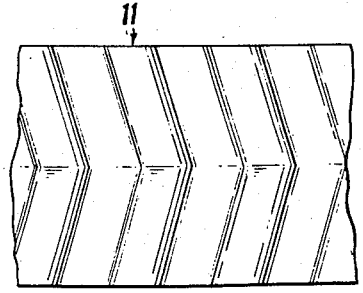
Figure 4 is a plan view of a fragment of a corrugated strip.

The corrugations of the corrugated strip 11 do not extend straight across the strip but are made in the form of chevrons, as best shown in Figure 4, with an included angle of about 160°. This angle has been somewhat exaggerated in the drawing so as to illustrate the principle more clearly.

While this particular form of catalyst pack has a high surface-volume ratio, this ratio can be improved still further by treating the metal strips to increase their surface area. Such treatment may comprise for instance, perforating, indenting or roughening the strips, and the term "plain" as applied to the strips 10 is to be interpreted as not excluding strips which have been so treated.

What we claim as our invention and desire to secure by Letters Patent is:

1. A metal catalyst pack through which can be passed a fluid to be subjected to catalytic action, comprising a plurality of rows of transversely corrugated thin strips comprising catalyst metal at least on the surface, a plurality of plain strips interposed between said corrugated strips, all said strips being arranged edge-on to the flow of fluid, the corrugations of said corrugated strips being laterally distorted in the form of chevrons extending across the width of said corrugated strips to promote turbulence in the flow of fluid and contact of every portion thereof with catalyst metal.

2. A metal catalyst pack according to claim 1 in which said corrugated and plain strips consist of inactive metal coated with catalyst metal.

3. A metal catalyst pack according to claim 1 in which said plain and corrugated strips comprise silver as the catalyst metal.

4. A metal catalyst pack according to claim 1 in which the transverse corrugations are bent intermediate their ends to form an included angle of approximately 160°.

References Cited in the file of this patent

UNITED STATES PATENTS

| | | |
|---|---|---|
| 1,896,286 | Burns et al. | Feb. 7, 1933 |
| 2,045,632 | Colby | June 30, 1936 |
| 2,423,870 | Blessing | July 15, 1947 |
| 2,607,663 | Perry et al. | Aug. 19, 1952 |
| 2,636,572 | Fleisher | Apr. 28, 1953 |
| 2,644,777 | Havens | July 7, 1953 |

FOREIGN PATENTS

| | | |
|---|---|---|
| 260,107 | Italy | Sept. 6, 1928 |